US005694962A

United States Patent [19]

Kim

[11] Patent Number: 5,694,962

[45] Date of Patent: Dec. 9, 1997

[54] METHOD FOR CONTROLLING A WATER SUPPLY VALVE OF A WASHING MACHINE

[75] Inventor: Seung Hwan Kim, Seoul, Rep. of Korea

[73] Assignee: Daewoo Electronic Co., Ltd., Seoul, Rep. of Korea

[21] Appl. No.: 523,121

[22] Filed: Sep. 1, 1995

[30] Foreign Application Priority Data

Sep. 1, 1994 [KR] Rep. of Korea ........................ 94 22026

[51] Int. Cl.[6] ............................ D06F 33/02; F16K 31/02

[52] U.S. Cl. ............................ 137/2; 68/12.21; 137/387; 137/392

[58] Field of Search ................................ 68/12.05, 12.19, 68/12.21, 207, 208; 137/2, 387, 392; 307/118; 361/178

[56] References Cited

U.S. PATENT DOCUMENTS 3,986,372 10/1976 Karklys .................................. 68/12.21
5,159,823 11/1992 Fukuda et al. .......................... 137/387

FOREIGN PATENT DOCUMENTS 2478686 9/1981 France .................................. 68/12.21
0100159 7/1979 Japan .................................... 68/12.21

*Primary Examiner*—George L. Walton
*Attorney, Agent, or Firm*—Beveridge, DeGrandi, Weilacher & Young LLP

[57] ABSTRACT

A method for controlling a water supply valve of a washing machine uses an interrupt signal supplied from an interrupt signal generating section to an external interrupt terminal of a microcomputer to monitor whether a power fails or not, and uses a power source maintained for a certain time from the time of the power failure before a reset signal is generated, thereby closing the water supply valve. Thus, the water supply valve continuously maintains the open state even when the power fails during supplying the water to thereby prevent the continuous supply of the water within a washing tub.

4 Claims, 4 Drawing Sheets

METHOD FOR CONTROLLING A WATER SUPPLY VALVE OF A WASHING MACHINE

BACKGROUND OF THE INVENTION

1. Field of the Invention

The present invention relates to a method for controlling a water supply valve of a washing machine, and more particularly to a method for controlling a water supply valve for terminating water supply by closing a water supply valve prior to the supply of a reset signal from a reset signal generating section to a microcomputer when power fails while cleansing water is supplied to a washing tub via the water supply valve under the operating state of the washing machine.

2. Description of the Prior Art

Conventional washing machines in which power must be continuously supplied to a valve-driving solenoid to open a water supply valve until cleansing water is completely supplied involves a drawback of increasing power consumption. In addition, since the power is continuously supplied to the solenoid while supplying the cleansing water, the solenoid formed of a thin wire may be disconnected due to overheating or a fire may be started by excess current.

For the purpose of solving the drawbacks, various water supply valves of new structure have been developed to be employed. A driving circuit for driving the water supply valve, e.g., a triac driving circuit, is supplied with a water-supply-valve opening signal when the water supply valve should be open or a water-supply-valve closing signal when the water supply valve should be closed. In other words, once the water supply valve is open, the water supply valve is not closed by the time that the water-supply-valve closing signal is provided for closing the water supply valve.

However, when the power fails or turned off under the state that the water supply valve is open for supplying the cleansing water to the washing tub, the water supply valve maintains the open state to probably allow the cleansing water to flow over the washing tub. As currently available washing machines are usually automatic, a user is likely not to notice the operational state of the washing machine once he begins operating the washing machine. Therefore, the water is continuously supplied to flow over the washing tub in case of the power failure, thereby wasting the water. Furthermore, when the power supply is resumed, the user is possibly affected by an electric shock due to the overflowing water, and an electronic circuit of the washing machine may be out of order.

SUMMARY OF THE INVENTION

The present invention is devised to solve the foregoing problems resulting from power failure by using a voltage in the electronic circuit of the washing machine maintained for a certain time even after the power fails. It is an object of the present invention to provide a method for controlling a water supply valve, wherein, when power fails or is turned off while water is supplied to a washing tub by opening the water supply valve during a washing process, the power failure or power-off state is monitored to supply a water-supply-valve closing signal for closing the water supply valve before a reset signal is produced from a reset signal generating section.

To achieve the above object of the present invention, there is provided a method for controlling a water supply valve of a washing machine is performed by supplying a water-supply-valve opening signal by a microcomputer mounted for controlling an operation of the washing machine to a water-supply-valve controlling section for opening a water supply valve to fill up water within a washing tub in accordance with a predetermined algorithm during a washing process. Then, it is determined whether power fails or not based on an input signal received into the microcomputer, and it is determined whether the water supply is completed based on a signal from a water-level sensing section for monitoring the water level of the washing tub when it is determined the power does not fail in the step of determining the power failure. After repeating the steps of determining the power failure and of determining the completion of the water supply when the step of determining the completion of the water supply determines that the water supply is not completed, it is determined whether a predetermined time elapses from the point of the power failure when the step of determining the power failure determines that the power fails. Successively, the steps of determining the power failure and determining the elapse of the predetermined time are repeated when the step of determining the elapse of the predetermined time determines that the predetermined time does not elapse from the point of the power failure. Thereafter, a water-supply-valve closing signal is supplied by the microcomputer to the water-supply-valve controlling section for closing the water supply valve when the step of determining the elapse of the predetermined time determines that the predetermined time elapses or the step of determining the completion of the water supply determines that the water supply is completed. Finally, the microcomputer is reset after closing the water supply valve in the step of closing the water supply value when the step of determining the elapse of the predetermined time determines the elapse of the predetermined time.

Here, the signal utilized for determining the power failure in the step of determining the power failure is an interrupt signal generated from the interrupt signal generating section and supplied to an external interrupt terminal of the microcomputer.

Preferably, the predetermine time in the step of determining the elapse of the predetermined time is determined not to close the water supply valve in case of an instantaneous power failure which does not require the close of the water supply valve within the time from the point of the power failure to the point of the reset signal generation.

By adopting the method for controlling the water supply valve according to the present invention, the water supply valve does not maintain the open state but is closed once the power fails while the water is supplied by opening the water supply valve for not only blocking the overflow of the water out of the washing tub to conserve water but also preventing an accident owing to an electric shock and damage upon the electronic circuit of the washing machine.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

The preferred embodiment of a method for controlling a water supply valve of a washing machine according to the present invention will be described in detail with reference to accompanying drawings.

Figure 1:
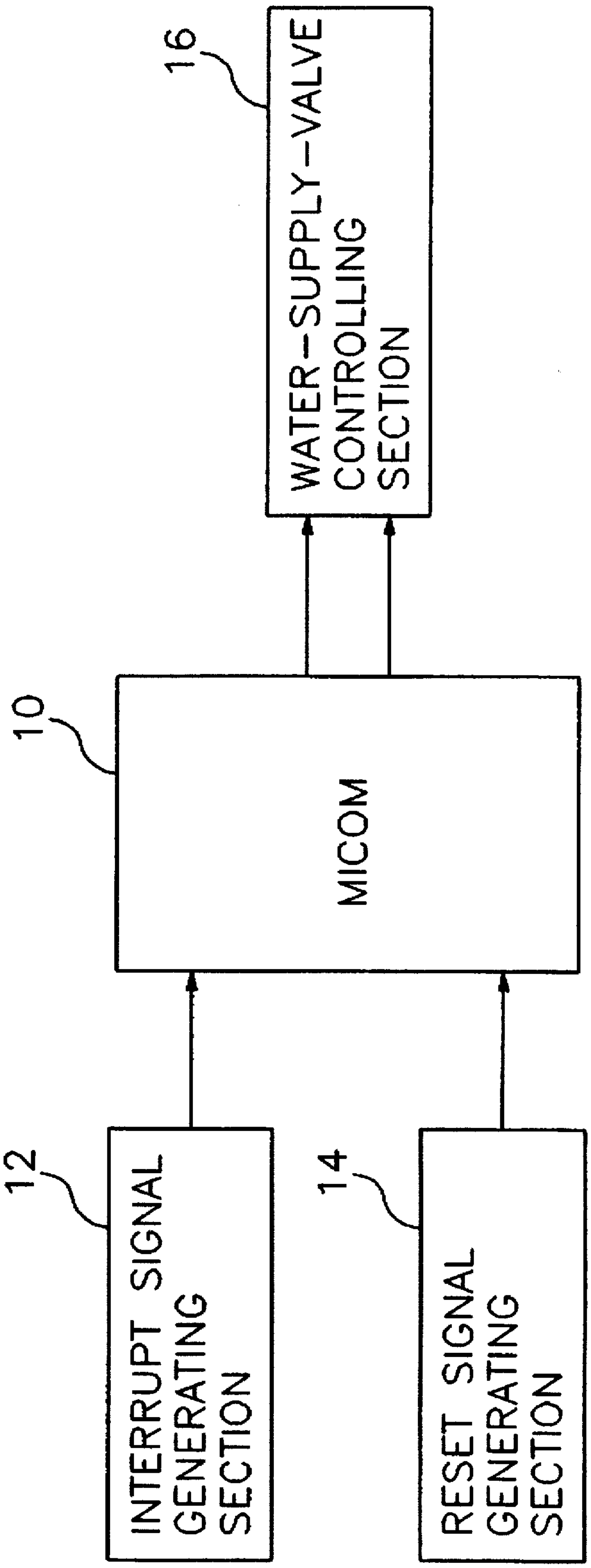
FIG. 1 is a block diagram showing a water-supply-valve controlling circuit utilized to carry out a method for controlling a water supply valve of a washing machine according to the present invention.

In FIG. 1, a water-supply-valve controlling circuit for using the method for controlling the water supply valve of the washing machine according to the present invention includes a microcomputer 10 which controls overall washing process in accordance with a predetermined algorithm. Also, an interrupt signal generating section 12 supplies an interrupt signal to an external interrupt terminal of microcomputer 10 in response to the supply of a power supply voltage, a reset signal generating section 14 produces a reset signal to a reset terminal of microcomputer 10 in order to initialize microcomputer 10. A water-supply-valve controlling section 16 opens/closes a water supply valve in accordance with opening and closing signals from microcomputer 10.

The elements shown in FIG. 1 are not separately required for adopting the method for controlling the water supply valve according to the present invention, but are the basic requisite elements of washing machines. Interrupt signal generating section 12 generates the interrupt signal used as a reference point of converting an output for minimizing a noise when the output of a driving part of the washing machine for driving a pulsator and the like which generate waterstream within the washing tub is changed and as a time reference of a real time during the washing process. Reset signal generating section 14 generates the reset signal which initializes microcomputer 10. Water-supply-valve controlling section 16 functions for opening/closing the water supply valve in accordance with the signal from microcomputer 10.

Figure 2:
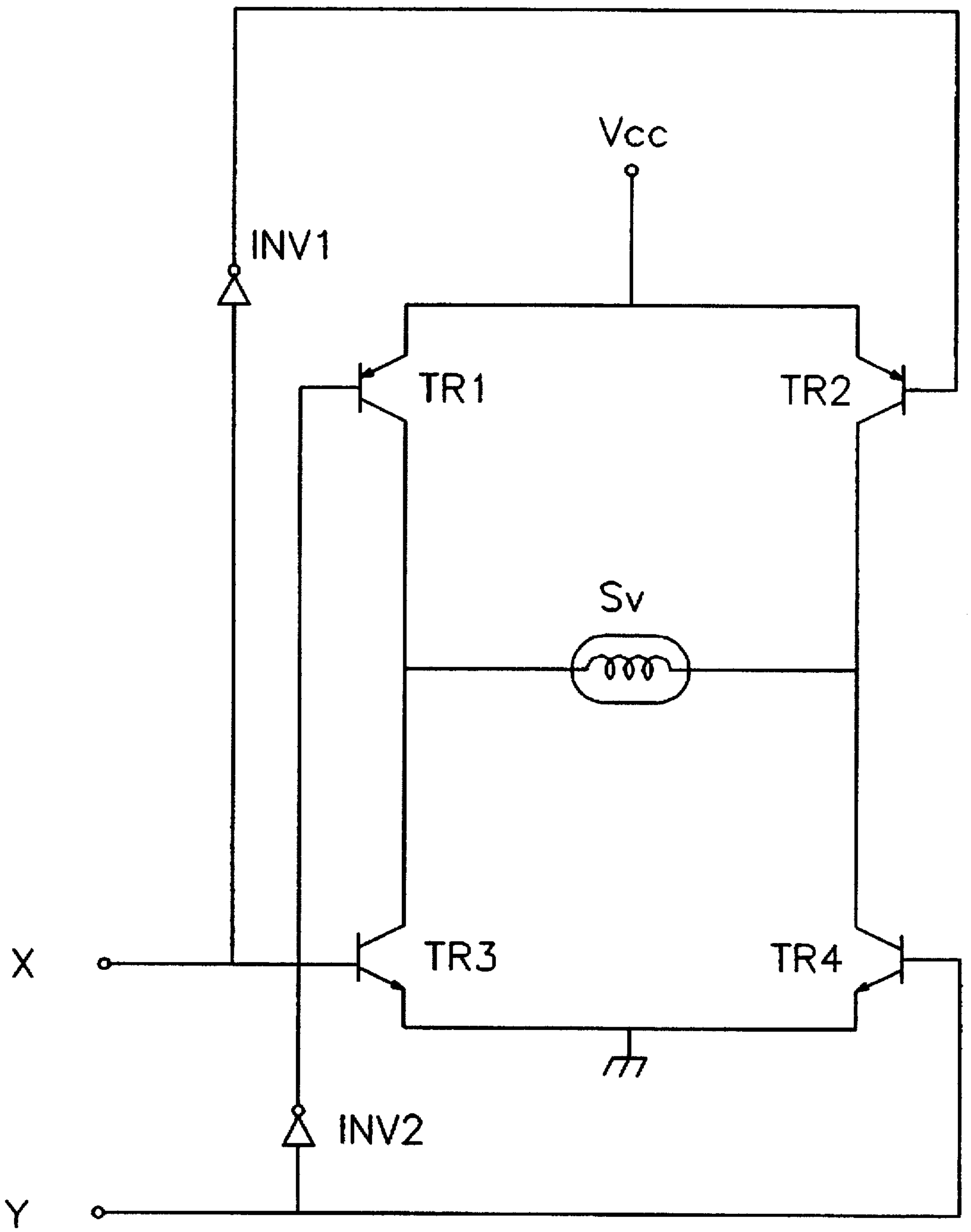
FIG. 2 is a circuit diagram showing one embodiment of the water-supply-valve controlling section shown in FIG. 1.

FIG. 2 is a circuit diagram showing one embodiment of water-supply-valve controlling section 16 illustrated in FIG. 1. Here, emitters of a first transistor TR1 and a second transistor TR2 of PNP-type are connected to each other to be supplied with the power supply voltage Vcc. Emitters of a third transistor TR3 and a fourth transistor TR4 of NPN-type are connected to each other, and then grounded. Collectors of first transistor TR1 and third transistor TR3 are connected to each other, and collectors of second transistor TR2 and fourth transistor TR4 are also connected to each other. The water supply valve Sv is connected between the collector of first transistor TR1 and that of second transistor TR2. A conductor connected to a first terminal X is branched in two, one of which is connected to a base of second transistor TR2 via a first inverter INV1 and the other is connected to a base of third transistor TR3. A conductor connected to a second terminal Y is branched in two, one of which is connected to a base of first transistor TR1 via a second inverter INV2 and the other is connected to a base of fourth transistor TR4.

Figures 3A, 3B, 3C, 3D, 3E:
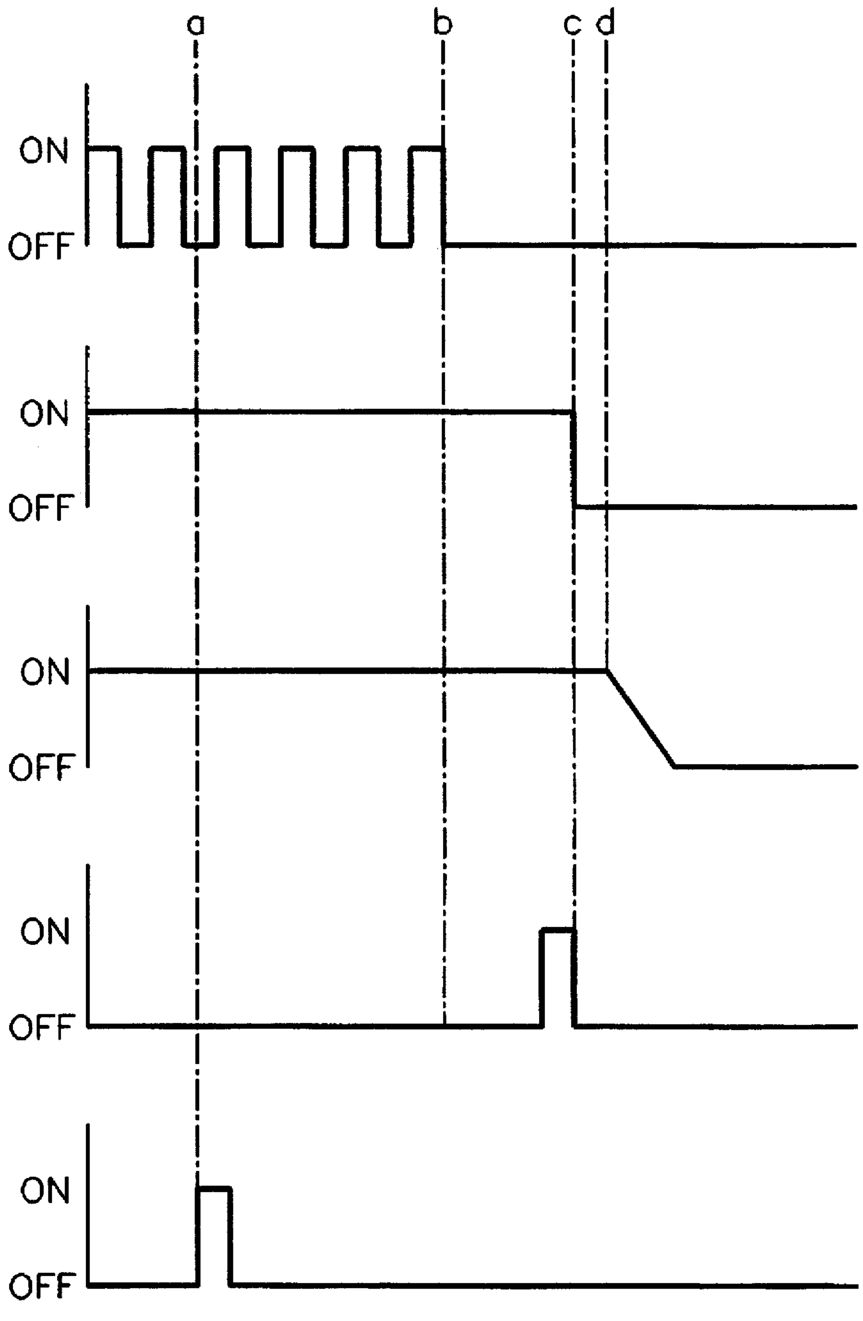
FIG. 3 shows input/output waveforms of the water-supply-valve controlling section of FIG. 1.

FIG. 3 shows input/output waveforms of the water-supply-valve controlling section of FIG. 1 when the power fails during supplying the water. In FIGS. 1 and 3, a waveform A designates the interrupt signal generated from interrupt signal generating section 12 to be received into the external interrupt terminal of microcomputer 10. A waveform B is the reset signal generated from reset signal generating section 14 to be received into the reset terminal of microcomputer 10. A waveform C is the power supply voltage for operating an electronic circuit of the washing machine. A waveform D and a waveform E respectively designate the water-supply-valve closing signal and water-supply-valve opening signal outputted from microcomputer 10. In FIG. 3, the transversal axis is a time axis. Also, a point a denoted by a dotted line is the point of starting the water supply for supplying the water to the washing tub, a point b denotes the point of the power failure or power-off, a point c denotes the point of turning off the reset signal from reset signal generating section 14, and a point d denotes the point of decreasing the power source voltage caused by the power failure or power-off. As illustrated in the drawing, the power source voltage is maintained in the electronic circuit of the washing machine during a certain time even after the power failure. Then, by using the power source voltage, the water-supply-valve closing signal of waveform D is generated, which in turn closes water supply valve Sv.

Figure 4:
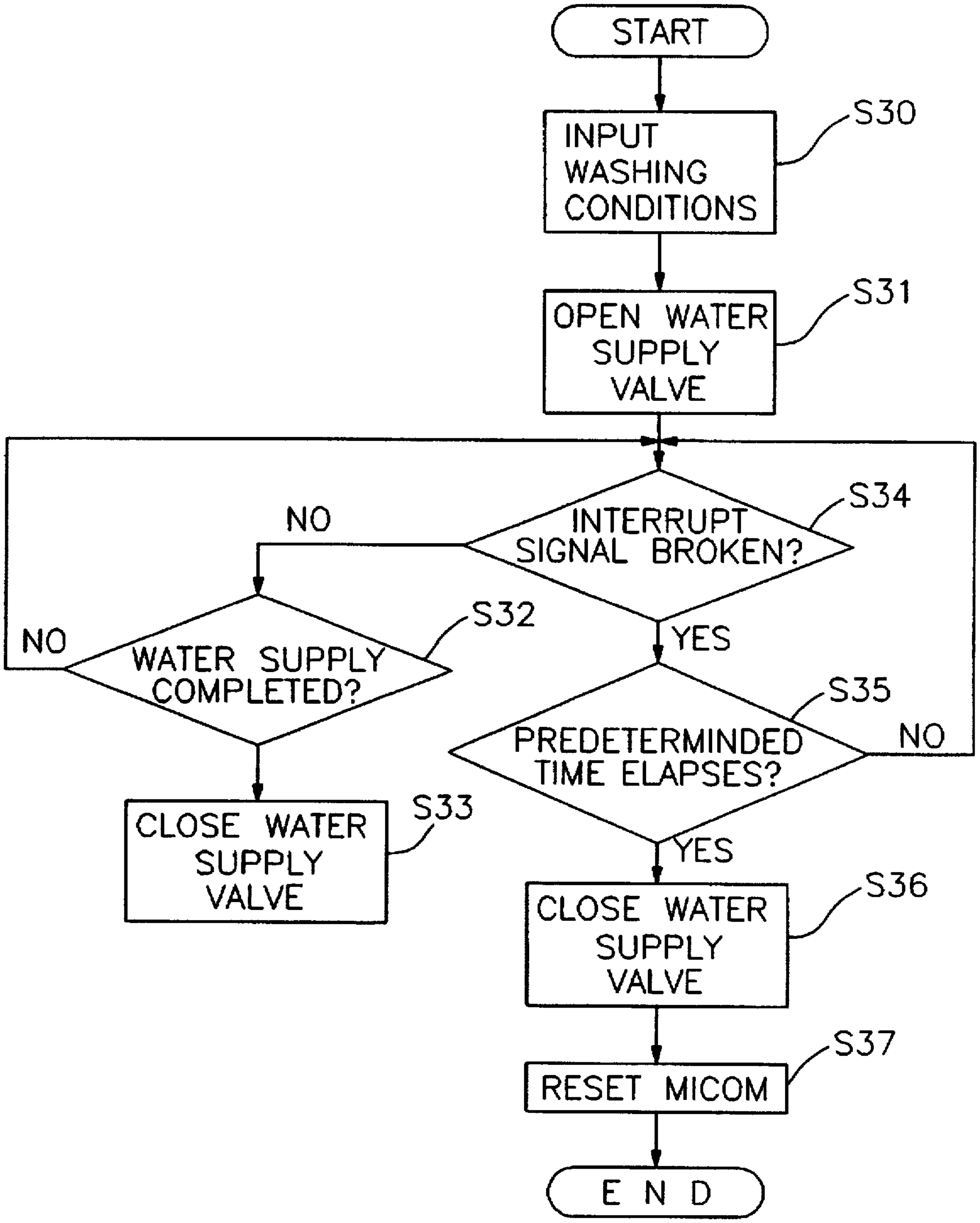
FIG. 4 is a flowchart showing the method for controlling the water supply valve according to the present invention.

Hereinafter, the method for controlling the water supply valve of the washing machine according to the present invention will be described with reference to FIG. 4. After a washing condition is inputted by a user in step S30, when a washing start button is pressed, the process proceeds to step S31 in accordance with the predetermined algorithm to drive the water supply valve. While the water supply valve is open to continuously supply the water, it is determined whether the external interrupt signal is broken or not in step S34. If the external interrupt signal is not broken, i.e., if the power failure or power-off does not occur, the process proceeds to step S32 to determine whether the water supply is completed or not. Upon the completion of the water supply, step S33 is performed to close the water supply valve. Otherwise, if the water supply is not completed, step S34 is carried out and steps S32 and S34 are repeated until the water supply is completed.

In step S34, when it is determined that the external interrupt signal is broken, the process proceeds to step S35 to determine whether a predetermined time elapses or not after the external interrupt signal is broken. If not, it proceeds to step S34 again. When the predetermined time elapses, the process proceeds to step S36 to close the water supply valve, and then to step S37 to reset microcomputer 10 shown in FIG. 1.

Now, with reference to the drawings, the controlling method according to the present invention will be described in detail. In step S30, once the washing condition is inputted by the user's manipulation of an operating panel (not shown) to operate the washing machine, microcomputer 10 carries out the washing process in accordance with the predetermined algorithm to supply the water-supply-valve opening signal as shown in waveform E of FIG. 3 to first terminal X of water-supply-valve controlling section 16 shown in FIG. 2. In response to this, third transistor TR3 is switched on, and a signal inverted through first inverter INV1 is supplied to the base of second transistor TR2, thereby switching on second transistor TR2. Since second transistor TR2 and third transistor TR3 are switching on, current flows through second transistor TR2, water supply valve Sv and third transistor TR3 to open the water supply valve and continue the water supply.

While the water is continuously supplied, microcomputer 10 determines whether the external interrupt signal is broken or not. As can be noted by waveform A shown in FIG. 3, the interrupt signal is broken at point b, i.e., at the power failure point. Accordingly, step S34 for determining the broken of the external interrupt signal is a step of sensing the power failure or power-off.

In case that the power does not fail or maintains the turning on state, the process proceeds to step S32 and steps S32 and S34 are repeated until the water reaches up to a predetermined level within the washing tub. When microcomputer 10 determines the complete filling of the water within the washing tub based on a signal from a water-level sensing section (not shown), microcomputer 10 provides the water-supply-valve closing signal to water-supply valve controlling section 16.

If the water-supply-valve closing signal is received into second terminal Y of water-supply-valve controlling section 16 as shown in FIG. 2, fourth transistor TR4 is switching on, and a signal inverted through second inverter INV2 is provided to the base of first transistor TR1 to switch on first transistor TR1. Since first transistor TR1 and fourth transistor TR4 are switching on, the current flows through first transistor TR1, water supply valve Sv and fourth transistor TR4 to close the water supply valve, thereby terminating the water supply.

If microcomputer 10 monitors the power failure or power-off, step S35 determines whether the predetermined time elapses or not from the time of failing or turning off the power. Then, the process proceeds to step S34 if the predetermined time does not elapse, and repeats steps S34 and S35 until the predetermined time elapses. The predetermined time is the time calculated from the point of power failure to an arbitrary point before the generation of the reset signal from reset signal generating section 14. The predetermined time is determined not to close the water supply valve in case of an instantaneous power failure or power-off which does not require for the closing of the water supply valve.

When the predetermined time elapses, microcomputer 10 provides the water-supply-valve closing signal to water-supply-valve controlling section 16 for closing the water supply valve. Thereafter, the reset signal from reset signal generating section 14 is turned off to reset microcomputer 10.

In the method for controlling the water supply valve of the washing machine according to the present invention as described above, if the power failure or power-off occurs under the state that the water supply valve is open to continuously supply the water to the washing tub, the water supply valve is closed to prevent the waste of water resulting from the flow of the water over the washing tub, and further prevent the accident from the electric shock and damage in the electronic circuit of the washing machine. For these reasons, even though a user cannot perceive the power failure during the water supply, water is not wasted while eliminating the possibility of damaging the electronic circuit of the washing machine.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A method for controlling a water supply valve of a washing machine comprising the steps of:

supplying a water-supply-valve opening signal by a microcomputer mounted for controlling an operation of said washing machine to a water-supply-valve controlling section for opening a water supply valve to fill up water within a washing tub in accordance with a predetermined algorithm during a washing process;

determining whether power fails based on an input signal received into said microcomputer;

determining whether the water supply is completed based on a signal from a water-level sensing section for monitoring the water level of said washing tub when power does not fail in said step of determining the power failure;

repeating said steps of determining power failure and of determining completion of water supply when said step of determining completion of water supply determines that water supply is not completed;

supplying a water-supply-valve closing signal by said microcomputer to said water-supply-valve controlling section for closing said water supply valve when said step of determining the completion of water supply determines that water supply is completed;

determining whether a predetermined time elapses from the point of said power failure when said step of determining power failure determines that power fails;

repeating said steps of determining power failure and determining the elapse of said predetermined time when said step of determining elapse of said predetermined time determines that said predetermined time does not elapse from the point of power failure;

supplying a water-supply-valve closing signal by said microcomputer to said water-supply-valve controlling section for closing said water supply valve when said step of determining elapse of said predetermined time determines that said predetermined time elapses; and resetting said microcomputer after said water supply valve is closed in response to said water-supply-valve closing signal supplied to said water-supply-valve controlling section when said step of determining elapse of said predetermined time determines elapse of said predetermined time.

2. A method for controlling a water supply valve of a washing machine as claimed in claim 1, wherein said signal utilized for determining power failure in said step of determining power failure is an interrupt signal generated from an interrupt signal generating section and supplied to an external interrupt terminal of said microcomputer.

3. A method for controlling a water supply valve of a washing machine as claimed in claim 1, wherein said predetermined time in said step of determining elapse of said predetermined time is determined not to close said water supply valve in case of an instantaneous power failure which does not require the close of said water supply valve within the time from the point of said power failure to the point of said reset signal generation.

4. A method for controlling a water supply valve of a washing machine comprising the steps of:

supplying a water-supply-valve opening signal by a microcomputer mounted for controlling an operation of said washing machine to a water-supply-valve controlling section for opening a water supply valve to fill up water within a washing tub in accordance with a predetermined algorithm during a washing process;

determining whether power fails based on an input signal received into said microcomputer;

determining whether the water supply is completed based on a signal from a water-level sensing section for monitoring the water level of said washing tub when power does not fail in said step of determining the power failure;

repeating said steps of determining power failure and of determining completion of water supply when said step of determining completion of water supply determines that water supply is not completed;

supplying a water-supply-valve closing signal by said microcomputer to said water-supply-valve controlling section for closing said water supply valve when said step of determining the completion of water supply determines that water supply is completed;

determining whether a predetermined time elapses from the point of said power failure when said step of determining power failure determines that power fails;

repeating said steps of determining power failure and determining the elapse of said predetermined time when said step of determining elapse of said predetermined time determines that said predetermined time does not elapse from the point of power failure;

supplying a water-supply-valve closing signal by said microcomputer to said water-supply-valve controlling section for closing said water supply valve when said step of determining elapse of said predetermined time determines that said predetermined time elapses; and resetting said microcomputer after said water supply valve is closed in response to said water-supply-valve closing signal supplied to said water-supply-valve controlling section when said step of determining elapse of said predetermined time determines elapse of said predetermined time, wherein said signal utilized for determining power failure in said step of determining power failure is an interrupt signal generated from an interrupt signal generating section and supplied to an external interrupt terminal of said microcomputer, and said predetermined time in said step of determining elapse of said predetermined time is determined not predetermined time is determined not to close said water supply valve in case of an instantaneous power failure which does not require the close of said water supply valve within the time from the point of said power failure to the point of said reset signal generation.

* * * * *